2,700,659

ACCELERATION OF VULCANIZATION BY MEANS OF N-ETHYL-2-THIAZOLINE SULFENAMIDE

Edward L. Carr, Akron, Ohio, assignor to The Firestone Tire & Rubber Company, Akron, Ohio, a corporation of Ohio No Drawing. Original application April 30, 1949, Serial No. 90,772. Divided and this application December 7, 1953, Serial No. 402,130

2 Claims. (Cl. 260—79.5)

This invention relates to the vulcanization of rubber or the like by use of a new class of accelerators.

This application is a division of my co-pending application Serial No. 90,772, filed April 30, 1949, which was in turn a continuation-in-part of application Serial No. 586,039, filed March 31, 1945, now abandoned.

An object of the invention is to provide an improved process of vulcanizing a rubber or synthetic rubber. Another object is to provide a vulcanizable rubber composition capable of rapid vulcanization at customary rubber curing temperatures, but free from the danger of setting-up during factory processing operations. The above and further objects will be manifest in the description of the invention which follows.

The new class of accelerators of this invention possesses the following formula:

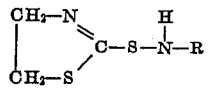

wherein R is an alkyl or cycloalkyl radical. The invention includes thiazoline-2-sulfenamides of the above structure in which R is isopropyl, sec. butyl, sec. amyl, sec. hexyl, sec. octyl, cyclohexyl, methylcyclohexyl, decyl, dodecyl, hexadecyl, methyl, ethyl, propyl, n-amyl, tert. butyl, n-heptyl, and similar alkyl and cycloalkyl radicals.

The following examples are given to illustrate the new class of accelerators and methods by which they may be synthesized.

EXAMPLE 1

A 3.3 molar aqueous solution of sodium thiazoline-2-mercaptide was prepared by dissolving 2-mercaptothiazoline in aqueous sodium hydroxide. An aqueous suspension of chloro-isopropylamine was prepared by adding 2.5 molar sodium hypochlorite solution to isopropylamine maintained at 0° C. The mercaptide solution was then gradually added, with stirring, to the aqueous suspension of the chloro-amine at a reaction temperature of 0° C. The molar ratio of amine to hypochlorite to mercaptide was 1.25 to 1.15 to 1.00 in this preparation. The reaction product, N-isopropyl-thiazoline-2-sulfenamide, separated as a white, crystalline substance, melting at 28.0–28.5° C. The structure of the product was proved by the following analytical results:

Calculated for $C_6H_{12}N_2S_2$: N, 15.89%; S, 36.38%. Found: N, 15.91%; S, 36.52%.

EXAMPLE 2

An aqueous suspension of chloro-sec. amylamine was prepared by adding 2.5 molar sodium hypochlorite solution to sec. amylamine maintained at 0° C. A 3.3 molar aqueous solution of sodium thiazoline-2-mercaptide was then gradually added, with agitation, to the chloro-amine suspension at a reaction temperature of 0° C. The molar ratio of reagents was the same as in Example 1. The reaction product, N-sec. amyl-thiazoline-2-sulfenamide, separated as a dark amber liquid, analyzing as follows:

Calculated for $C_8H_{16}N_2S_2$: N, 13.7%; S, 31.3%. Found: N, 12.7%; S, 29.7%.

EXAMPLE 3

An aqueous suspension of chloro-cyclohexylamine was prepared by adding 2.5 molar sodium hypochlorite solution to cyclohexylamine maintained at 0° C. A 3.3 molar aqueous solution of sodium thiazoline-2-mercaptide was then gradually added, with stirring, to the chloro-amine suspension at a reaction temperature of 0° C. The molar ratio of reagents was the same as in Example 1. The reaction product, N-cyclohexylthiazoline-2-sulfenamide, separated as white crystals, melting at 69–70° C. The structure of the product was proved by the following analytical results:

Calculated for $C_9H_{16}N_2S_2$: N, 12.95%; S, 29.64%. Found N, 13.00%; S, 29.60%.

EXAMPLE 4

Four grams of 2-mercaptothiazoline in a solution containing excess cyclohexylamine was treated with aqueous iodine-potassium iodide solution. The reaction product, N-cyclohexylthiazoline-2-sulfenamide, separated as a colorless liquid which, when freed from unreacted cyclohexylamine, solidified to a white crystalline solid, melting at 63–67° C.

The sulfenamides produced in accordance with Examples 1 and 2 were tested as rubber vulcanization accelerators in the following formula, in which all parts are given by weight:

Formula I

| | |
|---|---|
| Rubber | 100.0 |
| Antioxidant | 2.0 |
| Pine tar | 2.0 |
| Carbon black (E. P. C.) | 45.0 |
| Stearic acid | 4.0 |
| Zinc oxide | 2.5 |
| Sulfur | 2.5 |
| Accelerator | 1.0 |

Two rubber compositions were mixed in a conventional manner, in accordance with Formula I, to provide vulcanizable compositions differing only in the accelerator employed. Separate portions of the two compositions were heated at 280° F. for 30, 60 and 90 minutes, and the vulcanized compositions so produced were found to possess the following physical properties.

TABLE I

| Accelerator produced in accordance with— | Modulus at 400% elongation in lbs./in.² | | | Tensile Strength at break in lbs./in.² | | |
|---|---|---|---|---|---|---|
| (Cure in minutes) | 30 | 60 | 90 | 30 | 60 | 90 |
| Example 1 | 2,100 | 2,600 | 2,775 | 3,825 | 3,475 | 3,700 |
| Example 2 | 775 | 1,500 | 1,950 | 2,575 | 3,400 | 3,725 |

The above test demonstrates that the accelerators of the invention are very effective in speeding up the rubber vulcanization process, since the rubber composition in the absence of an accelerator is under-vulcanized after being heated in accordance with the above test, and the physical properties of such heated composition are substantially lower than the properties listed in Table I.

The cyclohexyl derivative of the invention, produced in accordance with Examples 3 or 4, was tested as an accelerator in Formula II.

Formula II

| | Parts by weight |
|---|---|
| Rubber | 100 |
| Sulfur | 3 |
| Stearic acid | 1.10 |
| Zinc oxide | 5 |
| Accelerator | 0.75 |

The rubber composition containing the cyclohexyl derivative was mixed in the usual manner and then separate portions were heated for 30, 60 and 120 minutes at 240° F. and at 20, 40, 60 and 100 minutes at 280° F. Likewise, a control composition, containing as an accelerator the conventional mercaptobenzothiazole, was mixed and then heated under the same conditions as the composition containing the cyclohexyl derivative of the invention. The physical properties of the two sets of heated rubber compositions are given in Table II.

TABLE II

| Accelerator | Modulus at 600% elongation in lbs./in.² | | | Tensile Strength at break in lbs./in.² | | |
|---|---|---|---|---|---|---|
| (Minutes at 240° F.) | 30 | 60 | 120 | 30 | 60 | 120 |
| Mercaptobenzothiazole | 225 | 725 | 875 | 825 | 1,575 | 2,875 |
| N-Cyclohexylthiazoline-2-sulfenamide | | 325 | 750 | | 1,950 | 2,825 |

| Accelerator | Modulus at 600% elongation in lbs./in.² | | | | Tensile Strength at break in lbs./in.² | | | |
|---|---|---|---|---|---|---|---|---|
| (Minutes at 280° F.) | 20 | 40 | 60 | 100 | 20 | 40 | 60 | 100 |
| Mercaptobenzothiazole | 675 | 725 | 650 | 575 | 2,525 | 2,650 | 2,725 | 2,500 |
| N-Cyclohexylthiazoline-2-sulfenamide | 650 | 1,050 | 1,250 | 1,650 | 2,850 | 2,375 | 3,200 | 2,650 |

The data presented in Table II show that the accelerators of the invention are very effective in a "gum-type" rubber formula to provide rapid vulcanization at customary curing temperatures (e. g. 280° F.), producing vulcanizates having high modulus and tensile properties. These data also show that the new accelerators are delayed-action accelerators, since the composition containing the cyclohexyl derivative was entirely unvulcanized after a 30 minute heating period at 240° F., whereas the mercaptobenzothiazole composition was partially vulcanized (well "set-up") after this short heating period. This result means that the accelerators of the invention may be used to provide rapid curing rubber compositions which are free from the usual tendency of such vulcanizable compositions to set-up during factory processing thereof, as during mill or Banbury mixing, calendering and extruding operations.

The vulcanizates produced in accordance with the invention possess excellent resistance to deterioration upon aging or flexing thereof, and they also exhibit low hysteresis properties. Thus, the vulcanizates are superior in pneumatic tire bodies, sidewalls and treads. Because of their freedom from tendency to scorch or set-up during processing, and also because of their rapid curing properties at tire vulcanizing temperatures, the vulcanizable compositions of the invention are highly desirable in chafer stocks and tire bead stocks.

The various synthetic rubbers susceptible to vulcanization by sulfur are equivalent to natural rubber in this invention. Such synthetic rubbers include GR—S (rubbery copolymers of butadiene or isoprene with styrene or substituted styrenes), rubbery butadiene and isoprene polymers, rubbery copolymers of butadiene and acrylonitrile, rubbery copolymers of isobutene and butadiene or isoprene, and various other known polymers, copolymers, terpolymers, etc. produced from monomers at least one of which is a conjugated diene.

The invention comprehends the acceleration of sulfur vulcanization whether the sulfur is present in the rubber composition as free sulfur or chemically bound sulfur available for vulcanization, as may be provided by the so-called "sulfur donors."

Examples of a few known sulfur donors are the following substances:

Tetramethylthiuram disulfide
Polysulfides of phenols and cresols
Diethyl xanthogen disulfide
Polyethylene polysulfides The accelerators of the invention are usually employed in the range of 0.5 to 2.0% by weight of the rubber in the vulcanizable composition, but they are useful in the broader range of 0.1 to 10%. Since the new accelerators are very efficient at the ordinary vulcanizing temperatures of 250–400° F., they do not require further activation for most purposes. However, they may be used in combination with one or more additional conventional accelerators and/or activators to provide special vulcanizable compositions displaying unusually rapid or critical vulcanizing properties and to produce vulcanizates exhibiting superior physical and chemical properties desired for special applications.

What is claimed is:

1. The process of vulcanizing rubber which comprises heating rubber and sulfur in the presence of a small quantity of N-ethyl-2-thiazoline sulfenamide.

2. The vulcanized rubber product obtained by heating rubber and sulfur in the presence of a small quantity of N-ethyl-2-thiazoline sulfenamide.

No references cited.